United States Patent [19]
Laxson

[11] 3,843,143
[45] Oct. 22, 1974

[54] CHUCK ADAPTER

[76] Inventor: Thomas Earl Laxson, 211 Lakeridge Rd., San Antonio, Tex. 78229

[22] Filed: Apr. 30, 1973

[21] Appl. No.: 355,502

Related U.S. Application Data

[63] Continuation-in-part of Ser. No. 136,945, April 23, 1971, abandoned.

[52] U.S. Cl. ..................... 297/1 A, 279/14, 279/99, 81/53.2, 81/185, 403/299
[51] Int. Cl. ............................................ B23b 51/12
[58] Field of Search ............. 81/185, 53.2, 71, 121, 81/DIG. 11; 279/1 A, 14, 99; 403/299, 287; 85/45

[56] References Cited
UNITED STATES PATENTS

| | | | |
|---|---|---|---|
| 2,714,026 | 7/1955 | Schultz | 279/1 A |
| 3,292,463 | 12/1966 | McKean | 81/53.2 |
| 3,463,209 | 8/1969 | Podolsky | 85/45 |

FOREIGN PATENTS OR APPLICATIONS

| | | | |
|---|---|---|---|
| 8,267 | 0/1903 | Great Britain | 81/53.2 |

*Primary Examiner*—Francis S. Husar
*Attorney, Agent, or Firm*—Eric P. Schellin

[57] ABSTRACT

This specification discloses an adapter for a chuck having an end face into which opens a threaded socket which enables the chuck to be operated by a manual device such as a wrench. The adapter comprises a generally cylindrical body having opposed end faces. Opening onto one of these end faces are a series of threaded bores which decrease in diameter away from the end faces. A threaded stem is screwed into the socket in the chuck and into one of the bores of the adapter. The adapter is formed with two structural arrangements for receiving the effective end of a hand tool for tightening the adapter on the stem.

Opening onto the other face of the adapter are a series of non-circular recesses which gradually decrease in diameter away from that face and any one of which is adapted to receive the head of a hand wrench. Extending from each of these sockets to the side surface of the adapter is a radial passage which is adapted to receive the end of a hand tool and the exterior surface of the adapter adjacent this end face is formed with two sets of wrench-engaging surfaces.

10 Claims, 7 Drawing Figures

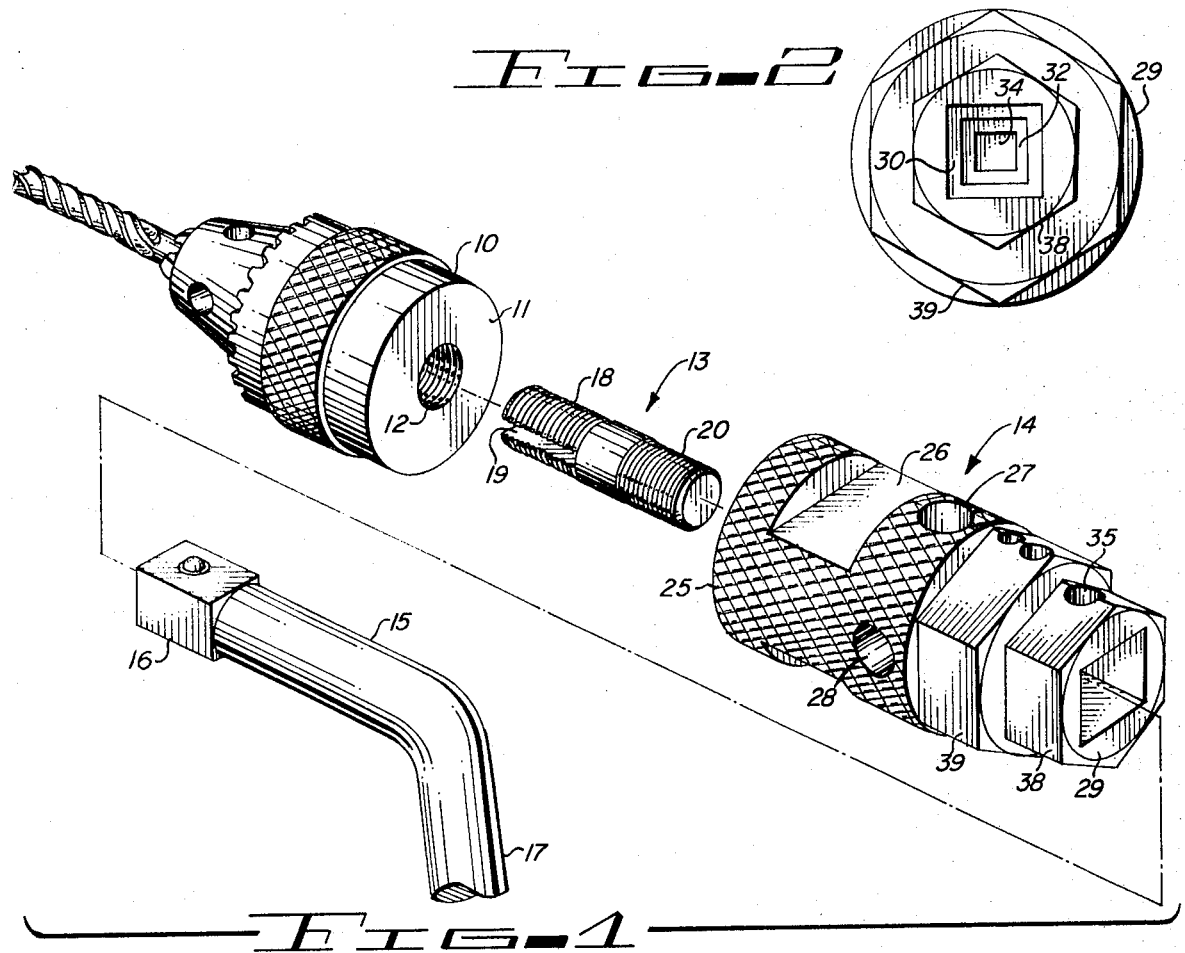
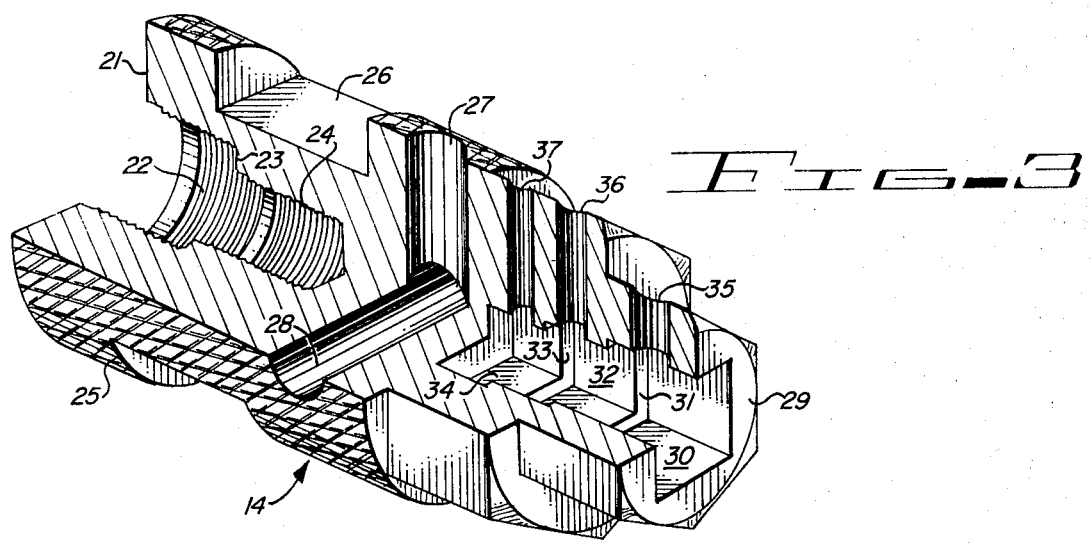

CHUCK ADAPTER

This application is a continuation-in-part of the copending application of Thomas Earl Laxson, Ser. No. 136,945, filed Apr. 23, 1971 for "Chuck Adapter" and now abandoned.

The present invention relates to chuck adapters and is concerned primarily with certain improvements which facilitate tightening the adapter on a stem which connects the adapter to a chuck and for supplementing the torque of a hand wrench which drives the adapter.

BACKGROUND OF THE INVENTION

At the present time, a chuck which is meeting with widespread use has an end face into which opens a threaded socket which is used in mounting the chuck in a machine tool. These sockets will vary in diameter with different chucks. If a chuck of this type is to be manually driven, such as by a hand wrench, provision must be made to establish the driving relation between the manual tool and the chuck.

An adapter provided for this purpose necessarily comprises a threaded stem. The adapter body must be capable of receiving threaded stems of different diameters and must be so constructed as to cooperate with small hand tools such as an open-end wrench or a T-handle to tighten the adapter on the stem and effectively tighten the stem in the chuck socket. The capability of accepting such small hand tools is desirable as it facilitates tightening the threaded stem in the chuck socket and the adapter on the stem.

One type of hand wrench which is now commonly available comprises a short shank having the free end formed with a non-circular head. A long arm extends outwardly from the shank in normal relation thereto. These hand wrenches come in various sizes and the driving heads are also of different dimensions. A chuck adapter should be capable of accepting any one of several heads of different sizes.

These hand wrenches are employed to manually rotate the chuck on the other end of the adapter. It is often desirable to either supplement the torque provided by the hand wrench or use another type of tool. Thus, the desirability of forming the adapter with structure which cooperates with other types of hand tools for generating torque is indicated.

OBJECTS OF THE INVENTION

With the foregoing conditions in mind, the present invention has in view the following objectives:

1. To provide a chuck adapter which is susceptible of use with chucks having end faces into which open threaded sockets of different diameters.

2. To provide a chuck adapter of the type noted which comprises a threaded stem and an adapter body formed with a threaded recess for receiving one end of the threaded stem.

3. To provide, in a chuck adapter of the character aforesaid, an adapter body having an end face onto which opens a series of threaded recesses which decrease in diameter away from that end face.

4. To provide, in a chuck adapter of the kind described, a chuck body having structural characteristics which accommodate a small hand tool for tightening the chuck body on the stem and the stem in the chuck socket.

5. To provide, in a chuck adapter of the type noted, a threaded stem having one end which is screwed into the chuck socket and which includes means for tightening the threads when so screwed into the socket.

6. To provide, in a chuck adapter of the character aforesaid, an adapter body having an end face remote from that which receives the threaded stem and which is formed with a series of non-circular sockets of different cross-sectional dimensions and which sockets gradually decrease in cross-sectional area away from the end face onto which they open.

7. To provide, in a chuck adapter of the kind described, a chuck body having an end portion adjacent to the end face formed with the non-circular sockets which is structurally formed to cooperate with manually operable tools of a type different from the hand wrench above described.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing a chuck adapter which consists essentially of a threaded stem and an adapter body. One end of this threaded stem is intended to be screwed into a threaded socket in a chuck and this end is split so that as it is screwed into the chuck socket the threaded engagement will be tightened.

The adapter body includes one end portion which is generally cylindrical and has an end face onto which opens a series of threaded recesses of different diameters with the largest recess being at this end face. One of these recesses receives the other end of a threaded stem of the same diameter. The external surface of this cylindrical portion is formed with a pair of spaced parallel flats which are adapted to receive an open-end wrench. Inwardly of these flats the cylindrical portion is formed with a pair of diametric passages in normal relation and either of which is adapted to receive the shank of a T-handle.

The adapter body has another end face remote from that which receives the threaded stem and this end face is formed with a series of non-circular sockets of different cross-sectional areas, with the socket of greatest cross-sectional area being at the end face and the other sockets arranged so that the cross-sectional areas thereof gradually decrease away from the end face.

The end portion adjacent this last-mentioned end face is formed with two sets of wrench-engaging surfaces and a radial passage extends from each non-circular socket to the external surface of the adapter body. One of the non-circular sockets is adapted to receive the driving head of a hand wrench of the same size and shape. The wrench-engaging faces on the external surface are adapted for cooperation with a wrench that may be either open-ended or have an opening corresponding in size and shape to the wrench-engaging faces. The shank of a hand tool may be inserted in any of the radial passages. Thus, the torque generated by the hand wrench having the head which is received in a socket may be supplemented by either a wrench in engagement with the wrench-engaging faces or a hand tool having a shank received in one of the radial passages.

For a full and more complete understanding of the invention, reference may be had to the following description and the accompanying drawings wherein:

FIG. 1 is a perspective illustrating the chuck adapter of this invention and a portion of a hand wrench in exploded relation;

FIG. 2 is an elevation of one end of the adapter body;

FIG. 3 is a perspective of the adapter body which is cut away, with portions thereof being shown in section;

DESCRIPTION OF THE FIRST EMBODIMENT

Figure 4:
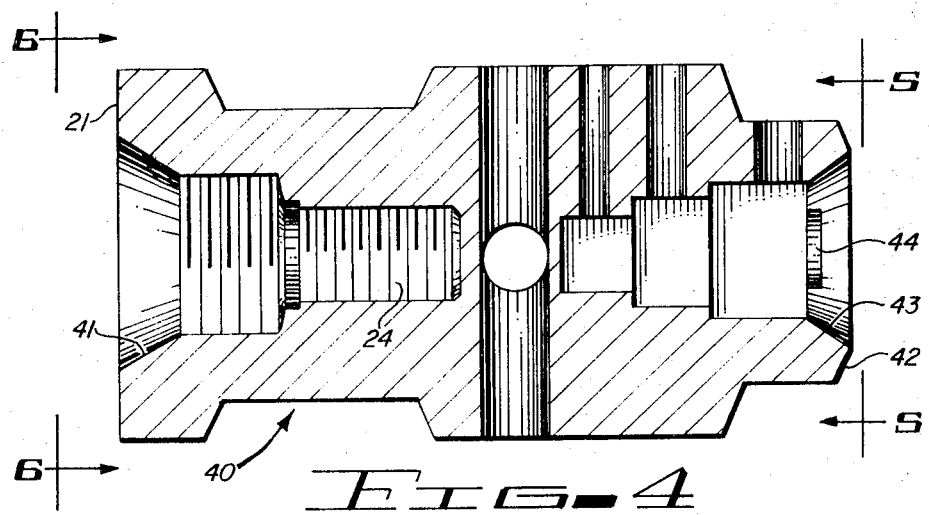
FIG. 4 is a section through a modified form of adapter body.

Referring now to the drawings, wherein like reference characters denote corresponding elements throughout the several views, and first more particularly to FIGS. 1, 2 and 3, a chuck 10 has an end face 11 formed with a threaded socket 12. It will be understood that the diameter of socket 12 will vary with different chucks. The chuck adapter of this invention comprises a threaded stem referred to in its entirety at 13 and an adapter body designated generally at 14. A hand wrench with which the chuck adapter 14 is intended to be used is shown as including a shank 15, a driving head 16, which is non-circular, with the square shape illustrated being one example of such a non-circular head, and an arm 17 which extends in a direction generally normal to the shank 15.

A stem 13 will be selected of a size to cooperate with the threaded socket 12 of the particular chuck with which the adapter is to be used. Stem 13 has an end portion 18 which is threaded and this threaded end portion is formed with a split by a slot 19. End portion 18 is screwed into chuck socket 12 and the split construction provides for a tightened engagement of the threads. Additional means for tightening the threaded engagement also may be provided in the form of a spring (not illustrated) which is inserted in the slot 19 or some form of bonding material such as a resin or epoxy. Stem 12 includes another end portion 20 which is threaded and which is received in one of the threaded recesses in adapter body 14 now to be described.

Referring now more particularly to FIG. 3, adapter body 14 has an end face 21 onto which opens a threaded bore 22. Bore 22 terminates at a shoulder 23 and opening onto this shoulder 23 is another threaded bore 24. It will be understood that while only two threaded bores 22 and 24 are illustrated, additional bores of different diameters may also be formed in adapter body 14. As shown more clearly in FIG. 1, adapter body 14 has a generally cylindrical external surface 25 adjacent to end face 21. This cylindrical portion 25 is formed with a pair of spaced parallel flats 26 which are adapted to receive the working end of an open-end wrench. Inwardly of flats 26, the cylindrical portion 25 is formed with a pair of diametric passages 27 and 28 which are normal to one another. The shank of a T-handle may be inserted in either end of either of these passages 27 and 28. It is notable that these passages 27 and 28 need not be in normal relation but may have any relative angular inclination. Also, they may be non-circular in cross-section or threaded.

Adapter body 14 has another end face 29 onto which opens a non-circular socket 30. This socket 30 is shown as square to correspond in shape to the driving head 16 of the hand wrench. Socket 30 terminates in a shoulder 31 and opening onto this shoulder 31 is another square socket 32 which is of smaller cross-sectional area than socket 30. Socket 32 terminates in a shoulder 33 and opening onto this shoulder 33 is another square socket 34 of still smaller cross-sectional area.

A radial passage 35 extends from socket 30 to the exterior surface of the adapter body. Another radial passage 36 extends from socket 32, and still another radial passage 37 from socket 34.

As shown more clearly in FIG. 1, the external portion of adapter body 14 adjacent to end face 29 is formed with a set of wrench-engaging faces 38. In the embodiment illustrated, these faces define a hex, but it is to be understood that this particular shape is not a limitation on the invention as other shapes defined by the wrench-engaging faces could be employed. Similarly, another set of wrench engaging faces is provided at 39 for a wrench of a different size.

OPERATION OF FIRST EMBODIMENT

End portion 18 of stem 13 is screwed into chuck socket 12 and end portion 20 into one of the bores 22 or 24 depending on the size of stem 13. The initial screwing action may be accomplished by simply grasping the cylindrical portion 25 which is knurled to facilitate manipulation. When it is desired to securely tighten the respective threaded engagements, an open-end wrench may be applied to the flats 26 or the shank of a T-handle inserted in one of the passages 27 or 28. Either of these devices will afford the mechanical advantage necessary for the thread tightening operation and may be carried out with a high degree of facility.

When the chuck is to be manually driven, a hand wrench of the type illustrated in FIG. 1 is preferably employed. In using this hand wrench, the head 16 is inserted in the appropriate socket 30, 32 or 34. This hand wrench will ordinarily have a long arm 17 which will afford appreciable mechanical advantage. Should a smaller amount of torque be sufficient, another type of hand wrench may be applied to one of the sets of wrench faces 38 or 39, or a hand tool such as a simple bar may be inserted in one of the passages 35, 36 or 37. This same procedure may be followed should it be desired to supplement the torque afforded by the hand wrench having the driving head 16.

FIRST MODIFICATION

Figure 5:
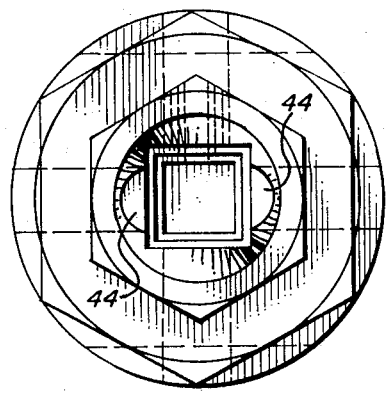
FIG. 5 is an elevation of one end of the adapter body of FIG. 4 being taken on the plane of the line 5—5 of FIG. 4.
Figure 6:
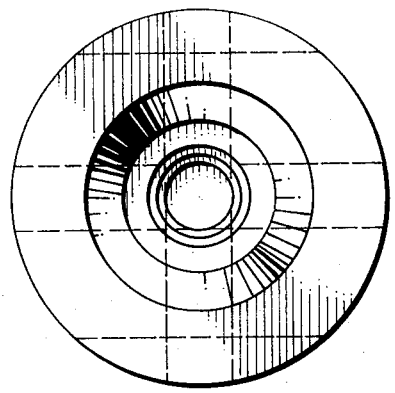
FIG. 6 is an elevation of the other end of the adapter body being taken on the plane of the line 6—6 of FIG. 4.

Referring now more particularly to FIGS. 4, 5 and 6, a modified form of adapter body will be described. In this connection it is noted that most of the elements of FIGS. 1, 2 and 3 are repeated in this form and they will therefore bear the same reference characters. The chuck body of FIG. 4 is identified generally at 40. It has end face 21 at one end and opening thereonto is a conical recess 41 which acts as a guide in inserting the end portion 20 of a stem 13 into one of the sockets 22 or 24. At the opposite end chuck body 40 has an end face 42 which is slightly conical and opening thereonto is a conical recess 43. This recess 43 is formed with a pair of depressions 44 which have a shape corresponding to the ends of an oval shaped head on a hand wrench. Thus, conical recess 43 not only acts as a guide in positioning the head of a hand wrench, but the depressions 43 accommodate a driving head of oval shape on a hand tool.

SECOND MODIFICATION

Figure 7:
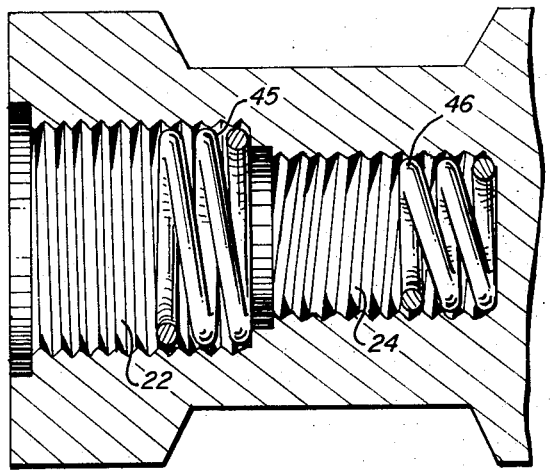
FIG. 7 is a sectional view on an enlarged scale of a further modification.

Referring to FIG. 7, a coiled spring 45 is shown and positioned at the bottom of threaded bore 22 and another coiled spring 46 at the bottom of threaded bore 24. These springs are provided to absorb shock and prevent excess torque on a stem 13 which is threaded into one of the bores 22 or 24.

While preferred specific embodiments are herein disclosed, it is to be clearly understood that the invention is not to be limited to the exact construction, mechanisms and devices illustrated and described because various modifications of these details may be provided in putting the invention into practice.

What is claimed is:

1. For use with a chuck having an end face onto which opens a threaded socket, a chuck adapter comprising:
   a. a threaded stem having an end portion adapted to be screwed into said threaded socket and another end portion projecting from said end face after the first mentioned end portion is screwed into the threaded socket;
   b. an adapter body having a pair of opposed end faces;
   c. a series of threaded bores of different diameters opening onto one of said end faces with the bore of the largest diameter being at said end face and the remaining bores arranged in decreasing diameter away from said bore of largest diameter, one of said bores receiving an end portion of said threaded stem;
   d. said adapter body being formed in the region adjacent to said threaded bores, with structural elements adapted to cooperate with a small hand tool in tightening said body on said stem and the stem in said threaded socket;
   e. a series of non-circular sockets of different cross-sectional areas opening onto the other of said end faces, with the socket of the largest cross-sectional area at the end face and the remaining sockets decreasing in cross-sectional area away from said socket of largest cross-sectional area, each of said sockets being adapted to receive the driving head of a hand wrench, and
   f. structural elements on said adapter body in the region of said non-circular sockets adapted to cooperate with a manual tool in applying torque to said adapter body.

2. The chuck adapter of claim 1 in which the structural elements in the region of said bores include a pair of spaced parallel flats.

3. The chuck adapter of claim 1 in which the structural elements in the region of said bores include a pair of diametric passages.

4. The chuck adapter of claim 2 in which the adapter body is formed with an external knurled surface in the region of said threaded bores and the structural elements in said region comprise a pair of spaced parallel flats and a pair of diametric passages in normal relation.

5. The chuck adapter of claim 1 in which the structural elements in the region of said non-circular sockets include a set of wrench-engaging faces on the external surface of said adapter body.

6. The chuck adapter of claim 5, together with a second set of wrench-engaging faces on the external surface of said adapter body in the region of said non-circular sockets.

7. The chuck adapter of claim 1 in which the structural elements in the region of said non-circular sockets include a radial passage extending from one of said sockets to the external surface of said adapter body.

8. The chuck adapter of claim 7, together with additional radial passages extending from the other of said non-circular sockets to the external surface of said adapter body.

9. The chuck adapter of claim 1 in which the threaded bore of maximum diameter opens onto an end face of the adapter body by way of a conical recess and the non-circular socket of maximum cross-sectional area opens onto the other end of the face of said adapter body by way of a conical recess which is formed with a pair of diametrically opposed curved depressions.

10. The chuck adapter of claim 1, together with a coiled spring at the inner end of each of said threaded bores for absorbing shock and torque generated by screwing said adapter body onto said threaded stem.

* * * * *